3,135,887
ARTICULATED MOTOR ASSEMBLY
Stephan Schaffan, Irvington, N.J., assignor to Atlas Tool Co., Inc., Hillside, N.J., a corporation of New Jersey
Filed June 22, 1962, Ser. No. 204,506
8 Claims. (Cl. 310—154)

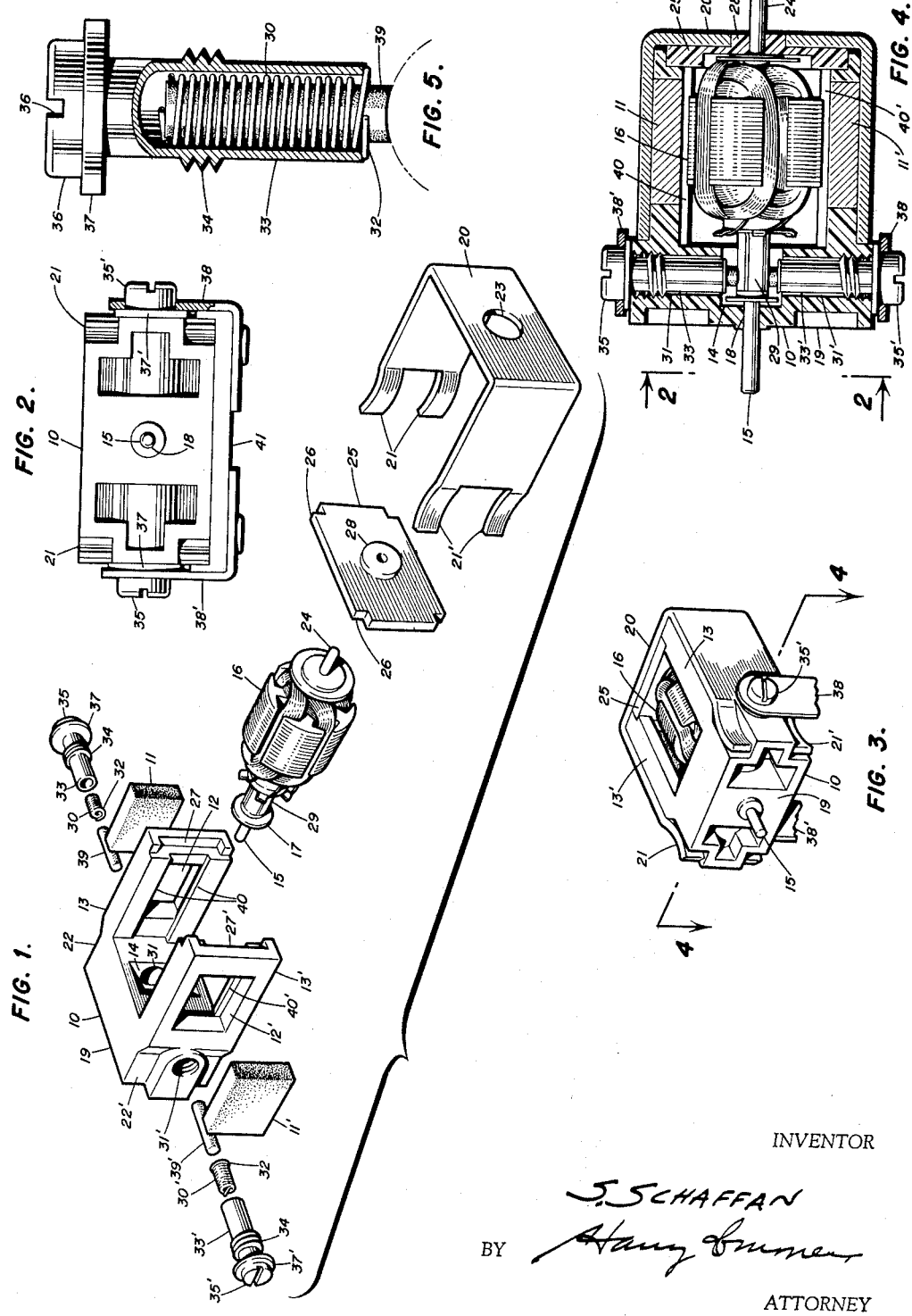

This invention relates to an articulated assembly motor formed of parts which may be readily aligned and interrelated for interlocking, on assembly, into the complete motor, the parts being held in such assembled relation until it is desired to disassemble for repair or replacement of the parts; disassembly being readily achieved without danger of damage to the parts. Articulated assembly motors in accordance with this invention may be manufactured in economical production line procedures and in sizes of a small horsepower if desired, as standard, durable units. Upon the wearing out of one or more of the parts the units may be returned and readily disassembled and new parts substituted for those worn out. Thus the invention enables an appreciable saving to be had in the use and cost of repairs to motors, and materially prolongs the useful lives thereof (usually only certain parts wear out from time to time and these may thus be readily replaced). Pursuant to the invention, the motor parts may be readily fabricated in quantity production as standard precision units of low cost, assembled rapidly and efficiently.

The drawings, illustrating procedures and devices useful in carrying out the invention, and the description below, are exemplary only of the invention, which shall be deemed to cover all other devices and procedures coming within the scope and purview of the appended claims.

In the drawings, wherein similar reference characters indicate like parts:

FIG. 1 is an exploded perspective view of an articulated motor assembly embodying the invention, the parts being shown disassembled, FIG. 2 is an end elevational view of the assembled motor, FIG. 3 is a perspective view of a motor embodying the invention, shown assembled, conductor terminals being shown in electrical contact therewith, FIG. 4 is an enlarged horizontal sectional view thereof, taken at line 4—4 of FIG. 3, and FIG. 5 is an enlarged, partly sectional view of a tube member and associated spring and brush slidably held in the tube member and urged by the spring against the commutator—the latter being shown in dotted lines.

As shown in the drawings (FIG. 1) an articulated assembly motor embodying the invention may include a casing 10 of plastic material having stator means which may comprise permanent magnets 11, 11' suitably secured to said casing, as by being positioned in openings 12, 12' in side walls 13, 13' of said casing. For simplicity of manufacture, the magnet faces directed toward each other and facing the armature may be planar as shown. The casing is further provided (FIG. 4) with a recessed portion 14 at one end thereof for reception of a shaft end 15 of the armature rotor member 16, which may (FIG. 1) have an end ring or washer 17 thereon. Means such as an aperture 18 is provided in the casing end wall 19 to rotatably receive the said end 15 of the armature shaft and thereby rotatably journal the armature in the casing 10. A plate 20 (FIG. 1) is formed complementarily to the casing for snapping interengagement therewith, as for example, by forming said plate U-shaped, with inwardly bowed fingers 21, 21' at the free end of the plate, to snap into inwardly recessed portions 22, 22' of the casing. The plate 20 is further provided with an aperture 23 which may be of a small enough size to receive the other end 24 of the rotor 16 or to receive a member through which in turn the said other end 24 passes, as exemplified in FIG. 1, wherein said member comprises a block 25 having shouldered portions 26 to interengage recessed portions 27, 27' of the side walls 13, 13' of the casing 10. The block 25 is further provided with an apertured boss 28 which may interfit within the aperture 23 of the plate 20 on assembly of the parts (FIG. 4).

If it is desired to disassemble the parts for inspection, repair or replacement of any of the parts, this may be readily done by snapping the fingers 21, 21' out of the recessed portions 22, 22' of the casing 10. Upon repair or replacement of the parts being effected, the parts are reassembled as shown in FIGS. 3 and 4.

The armature 16 is provided with a commutator 29 thereon. Elongated springs 30, 30' are positioned in apertures 31, 31' transversely disposed in said casing in line with the commutator diametrically (FIG. 4). The springs are fixed at one end 32 (FIG. 5) to the casing or to tubes 33, 33' positioned in said apertures, as, for example, by providing said tubes with threaded portions 34 (FIG. 5) to be threaded into the casing apertures, as by cutting thereinto (the casing being preferably of plastic and the tubes of metal or other harder material). Said tubes may be further provided with head portions 35 (FIG. 4) which may be slotted as at 36 (FIG. 5), the head portions extending outwardly of the casing (FIG. 4) so that the user, by rotating the tubes 33 may locate the spring-urged brushes 39, 39' properly. The tube head portions 35, 35' may be flanged as noted at 37, 37' (FIG. 1) for facility of positioning the ends of conductor terminals 38, 38' against the tube heads (FIG. 2) for electrical connections. To this end more than one conductor terminal may be secured to one tube, as for example, may be desired for effecting various connections of electrical equipment to the conductor terminals. Ribs 40, 40' (FIG. 1) on the casing properly locate the magnets 11, 11' and prevent their movement toward the armature. The motor may be utilized for driving any mechanism and may be mounted on a base 41 (FIG. 2) to which terminals 38, 38' may be attached. Springs 30 are formed in the main of convolutions of slightly lesser diameter than the interior of the tubes 33, the inner ends of the springs being inturned diametrically, while the outer ends of the springs are extended outwardly so as to abut or be disposed against the ends of the tubes as shown in FIG. 5. Thus the inner ends of the springs hook over or abut against the inner ends of the brushes 39 and urge the latter into contact with the commutator 29 indicated in dotted lines in FIG. 5. Terminals 38 may, as shown in FIG. 4, merely rest against the flanges 37; terminals 38, in such case, are made of spring material having their opposite ends fixed to the base 41 (FIG. 2) so that the terminals 38 tend to move inwardly and thus into abutment with the flanges 37. The tube heads 35, 35' may, as above noted be elongated so that more than one terminal may thus be disposed against a tube head.

Having thus described my invention, what I claim as new and desire to secure by Letters Patent is:

1. An articulated motor assembly comprising a casing, permanent magnet stator means supported by the casing, an armature member, a plate resiliently, releasably engaging the casing, and complementary means interconnecting the armature member, plate and casing for rotatably journalling the armature in the casing and with respect to the plate when the motor is assembled, said casing having recessed portions therein, and resilient fingers on said plate arranged to snap into and interlock with said recessed portions on assembly of the parts.

2. In an articulated motor assembly as set forth in claim 1, said plate being generally U-shaped and having said resilient fingers at the free ends thereof, inwardly bowed to snap into said recessed portions of the casing.

3. In an articulated motor assembly, a generally U-shaped casing of insulating material an insulating plate, an insulating block closing off the open end of the U-shaped casing, an armature having bearings in the bight portion of the U-shaped casing and in the block, brushes in the casing engaging the armature for conducting current thereto, permanent magnet stator means supported by the casing and an outer resilient plate surrounding the legs of the U-shaped casing and the block and holding the block in position against the casing, said plate constituting the sole means for securing the block to the casing.

4. In an articulated motor assembly as set forth in claim 3, a boss formed on the block, said plate registering with the block when the motor is assembled and having an aperture for receiving the boss.

5. In an articulated motor assembly as claimed in claim 3, the complementary portions of the block and the casing comprising shouldered and recessed portions.

6. In an articulated motor assembly as set forth in claim 1, tubes mounted in said casing, spring pressed brushes in said tubes, said armature member having a commutator against which the brushes bear, the tubes being formed of harder material than the casing and being positioned in apertures provided in the casing, the tubes being externally formed so that on rotation thereof, they will cut into the casing apertures, thereby effecting movement of the tubes and thus the springs and brushes relative to the commutator.

7. In an articulated motor assembly as set forth in claim 6, said tubes being proportioned to project out of the casing apertures, the projecting ends being formed with shouldered stem portions against which conductor terminals may be positioned to electrically connect the terminals therewith.

8. In an articulated motor assembly as set forth in claim 6, the casing being formed of plastic material and the tubes being formed of metal and being positioned in apertures provided in the casing, the tubes being externally threaded so that on rotation thereof, the threads will cut into the casing apertures, thereby effecting movement of the tubes and thus the springs and brushes relative to the commutator.

References Cited in the file of this patent

UNITED STATES PATENTS 3,100,270    Case et al. _____ Aug. 6, 1963